United States Patent [19]
Fux

[11] 3,868,323
[45] Feb. 25, 1975

[54] APPARATUS FOR REMOVAL OF SETTLED OR STRAINED SOLIDS FROM SURROUNDING LIQUID

[75] Inventor: Kamil Fux, Schmerikon, Switzerland

[73] Assignee: Prometall Uznach AG, Uznach, Switzerland

[22] Filed: Sept. 6, 1973

[21] Appl. No.: 394,931

[30] Foreign Application Priority Data
Sept. 6, 1972  Switzerland...................... 13102/72
Nov. 28, 1972  Switzerland...................... 17329/72
Jan. 18, 1973  Switzerland........................... 725/73
Mar. 9, 1973  Switzerland......................... 3547/73

[52] U.S. Cl. ............................... 210/154, 210/527
[51] Int. Cl. ............................................. B01d 35/16
[58] Field of Search .......... 210/525, 527, 154, 158, 210/159

[56] References Cited
UNITED STATES PATENTS
2,006,825  7/1935  Downes .......................... 210/527 X
2,101,081  12/1937  Lund .................................. 210/527
2,335,573  11/1943  Scott .................................. 210/159
3,482,698  12/1969  Ostnas .............................. 210/159
3,498,465  3/1970  Klump et al. ..................... 210/527
3,498,467  3/1970  Hollebrandt ...................... 210/527
3,635,349  1/1972  Weiss et al. ....................... 210/527

Primary Examiner—Theodore A. Granger
Attorney, Agent, or Firm—Flynn & Frishauf

[57] ABSTRACT

In an installation for moving sludge along the bottom of a settling tank with a scraper or removing solids with a rake from a grating, in which a traveling carriage moves the scraper or rake back and forth, the reciprocating movement of the carriage is made to power the shift of position of the scraper or rake from an operating position for movement in one direction to an idling position for movement in the other direction, by interplay of a guideway and a spring-actuated extension arm. A skimmer for collecting floating solids is similarly operated. A hydraulic interlock may be used for maintaining the operating arm of the apparatus in position during travel between the end locations where its position is shifted.

15 Claims, 14 Drawing Figures

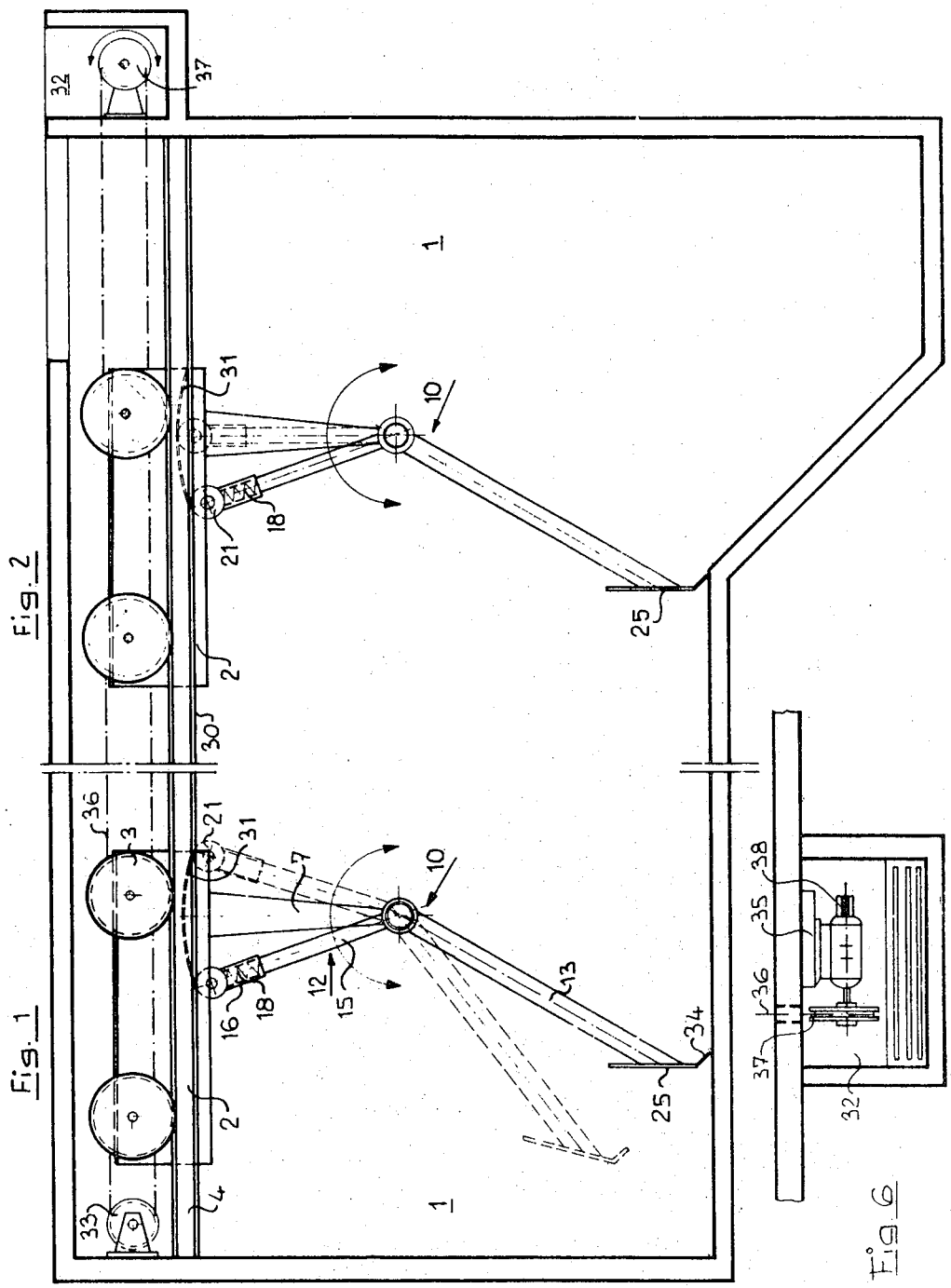

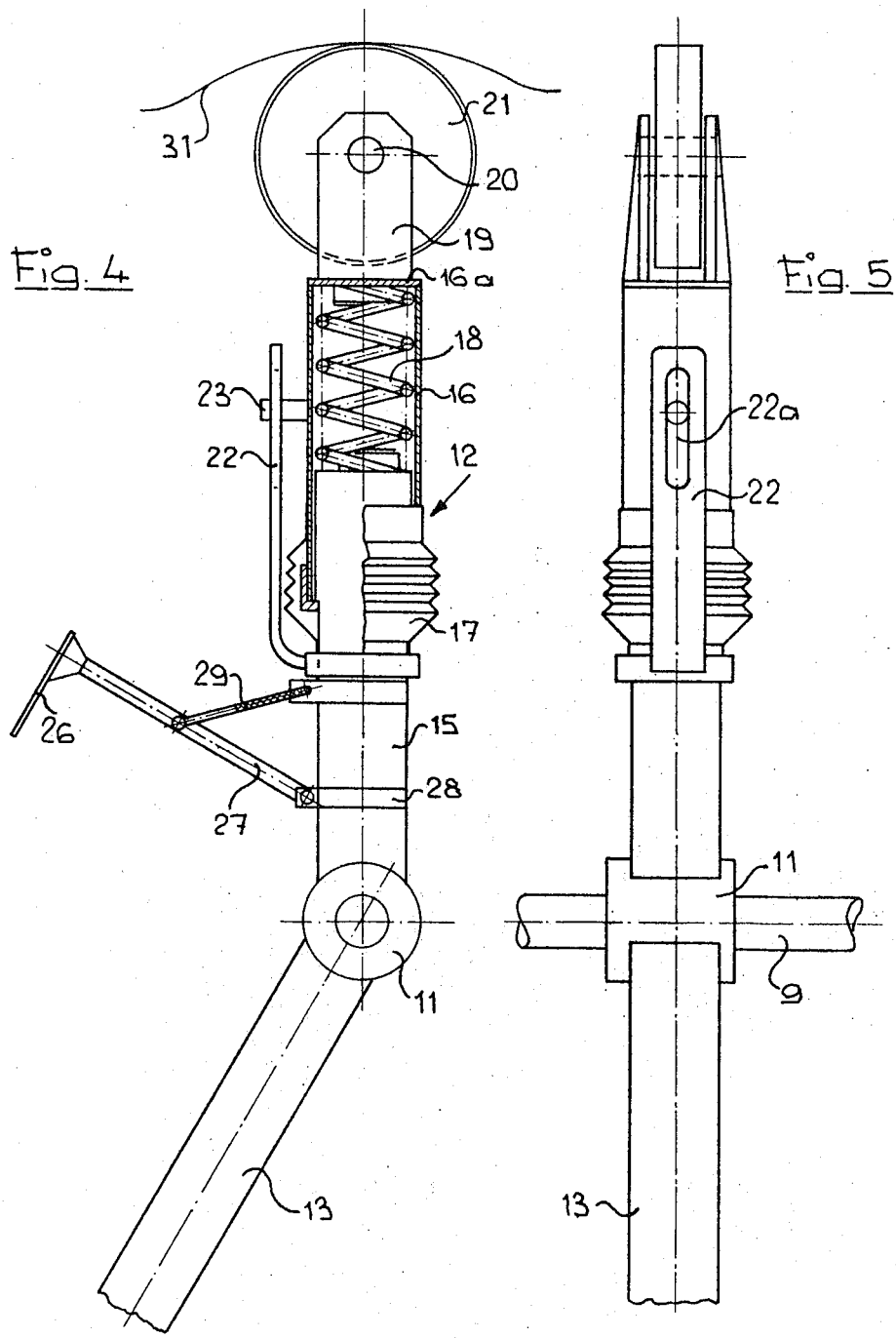

APPARATUS FOR REMOVAL OF SETTLED OR STRAINED SOLIDS FROM SURROUNDING LIQUID

This invention relates to a sludge or solid removal or a sludge displacing device for settling tanks, and more particularly such a device provided with a carriage movable back-and-forth above the settling tank contents and carrying a suspended sludge moving blade or rake, arranged to move in an operating position in one direction of the carriage and in an idle return position during motion of the carriage in the other direction.

Sludge moving apparatus of the reciprocating type is used in water purification and sewage treatment plants, for example for actuating scraper blades in settling tanks or for operating a rake in a grasping movement in the grating of a channel. The back-and-forth movement is common to all sludge and sediment removal installations of these kinds, and likewise the feature that the actual device engaging the solids moves in operative position in one direction and in an idling or disengaged position in the other direction. The sludge engaging device is carried on a movable bridge or carriage on which is located the drive for both the back-and-forth movement of the bridge or carriage, and for the shifting of the sludge engaging blade or rake from disengaged to engaged position and back. There is a disadvantage in such installations arising from the occurrence of corrosion phenomena, particularly in the electric drives and their associated equipment. Stoppages and down time occurring in installation located below floor level as the result of corrosion are particularly undesirable, because in these installations the machinery is not easily accessible.

The provision of the drives on the traveling bridge or carrier also has the result that the bridge or carrier must be of relatively heavy construction and generally occupies considerable vertical space, thereby increasing the cost of construction of the installation.

It is an object of the present invention to provide sludge removal apparatus for settling tanks and the like, in which these disadvantages can be avoided or overcome.

SUBJECT MATTER OF THE PRESENT INVENTION

Briefly, the arm or arms extending downward from a reciprocating carriage which carry the sludge moving blade or rake are pivoted to swing in the direction of the carriage movement, and a secondary arm is provided on at least one of the downwardly extending arms in fixed angular relation thereto. The secondary arm carries a follower along a guide path for controlling the position of the downwardly extending arm, and the position of the follower relative to the pivot of the arm structure is variable as the result of a spring bias coupling provided on the secondary arm.

In operation the structure just outlined causes the transition from operating position to disengaged or idling position of the sludge moving device to be actuated by the movement of the carriage itself, so that a separate drive is not necessary to provide these transitions. If then the drive for the reciprocating movement of the carriage is located in a fixed position, while the back-and-forth movement is produced by means of a cable operated by the drive, both the carriage and the sludge moving mechanism can be kept clear of all electrical equipment.

The invention will be described by way of example with reference to the accompanying drawings, wherein:

FIG. 1 is a diagrammatic side view of one end of a covered or underground settling tank in which the operating portion of the sludge removing apparatus according to the invention is shown;

FIG. 2 shows the other end of the settling tank of FIG. 1 with the operating portion of the sludge removing apparatus at the transition position;

FIGS. 4 and 5 are enlarged partial views from the side and front, respectively, of the arm structure at the bottom of which the sludge removing device is affixed;

Figure 7:
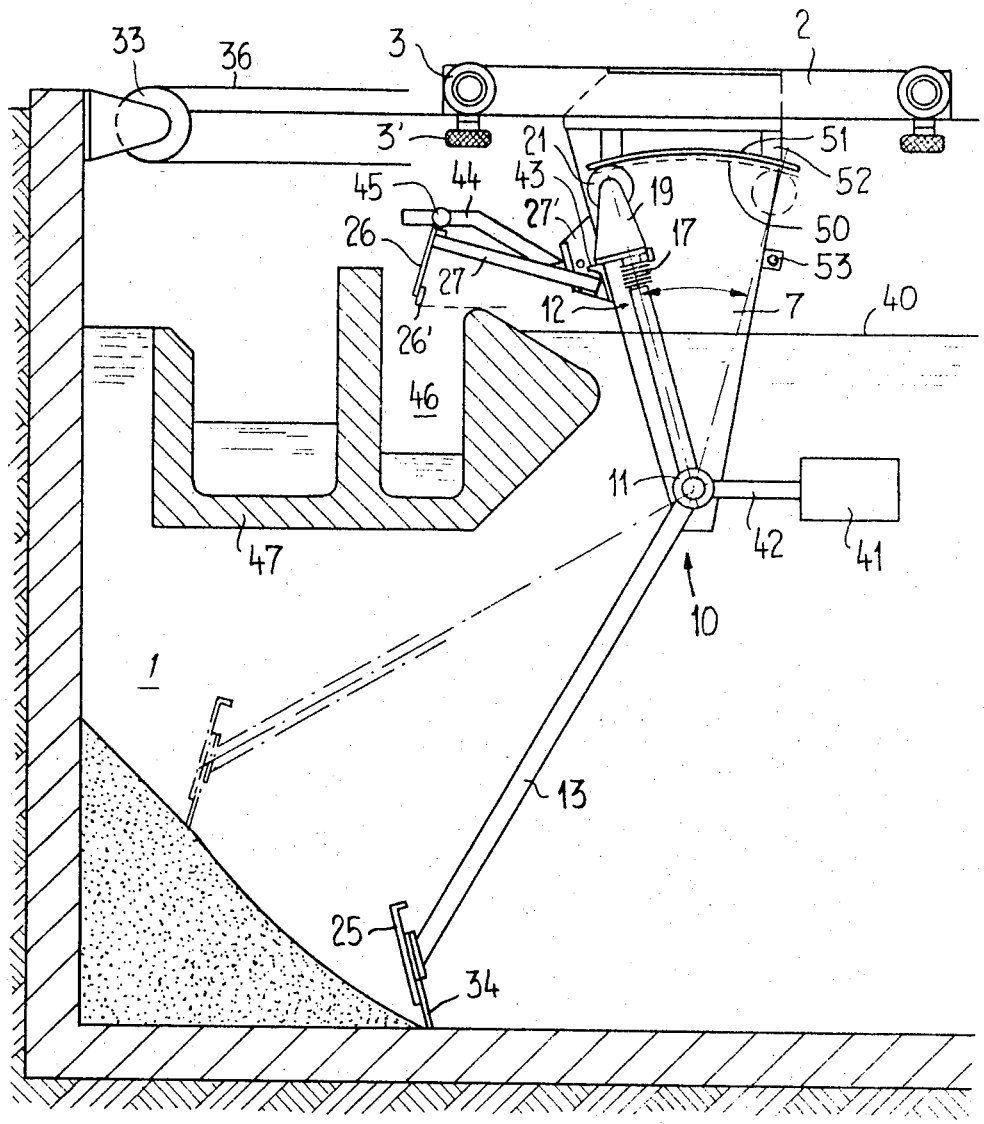
Figure 8:
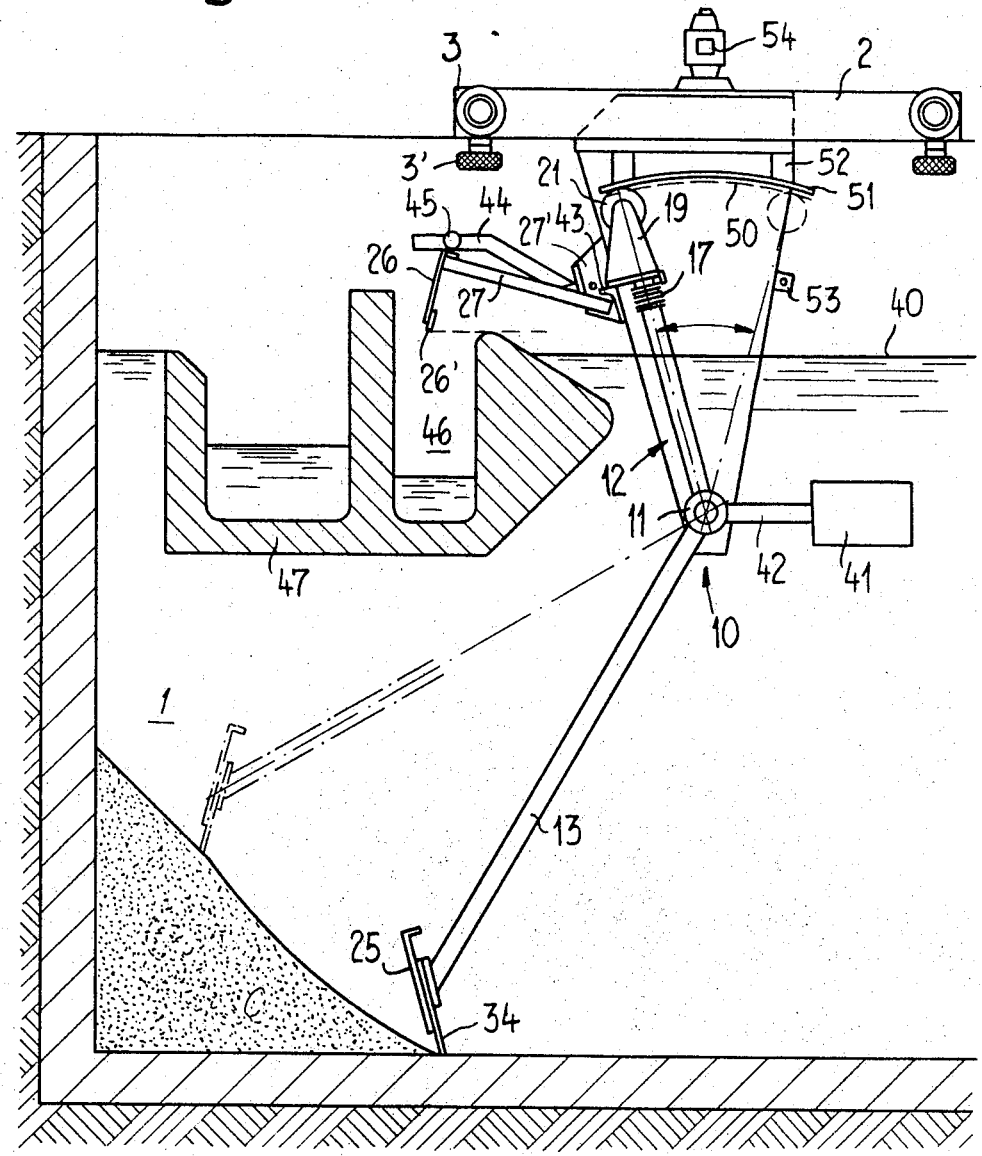
Figure 9:
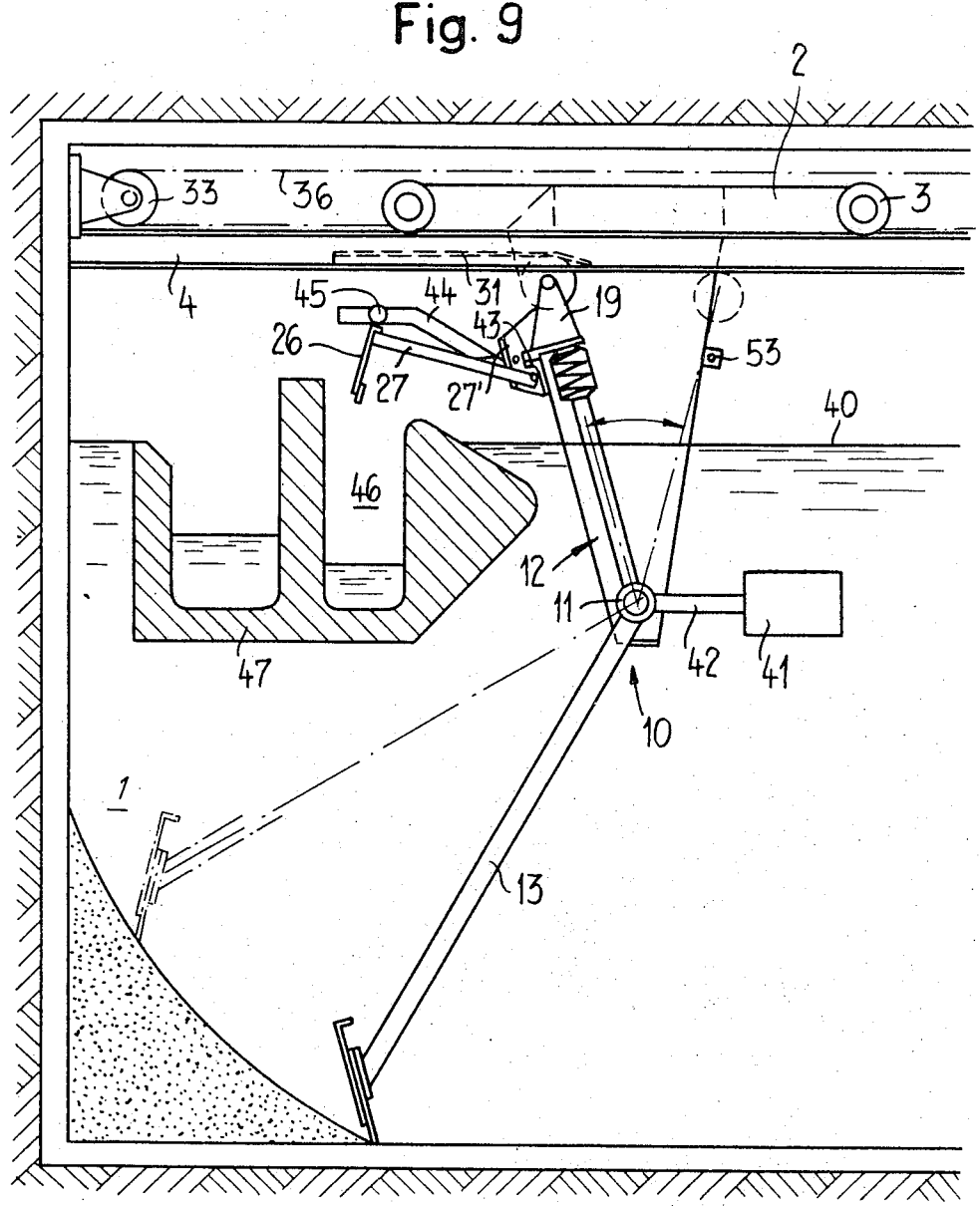
Figure 10:
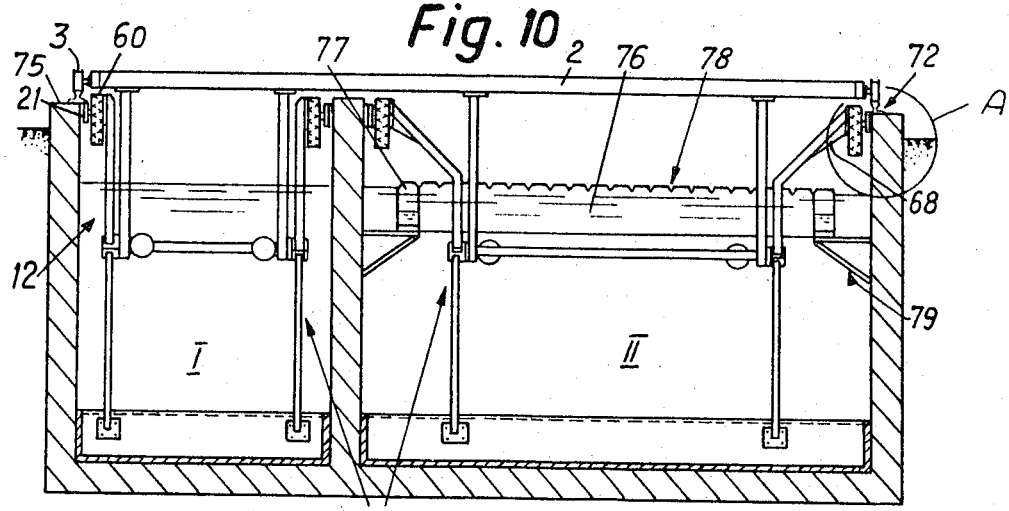
Figure 11:
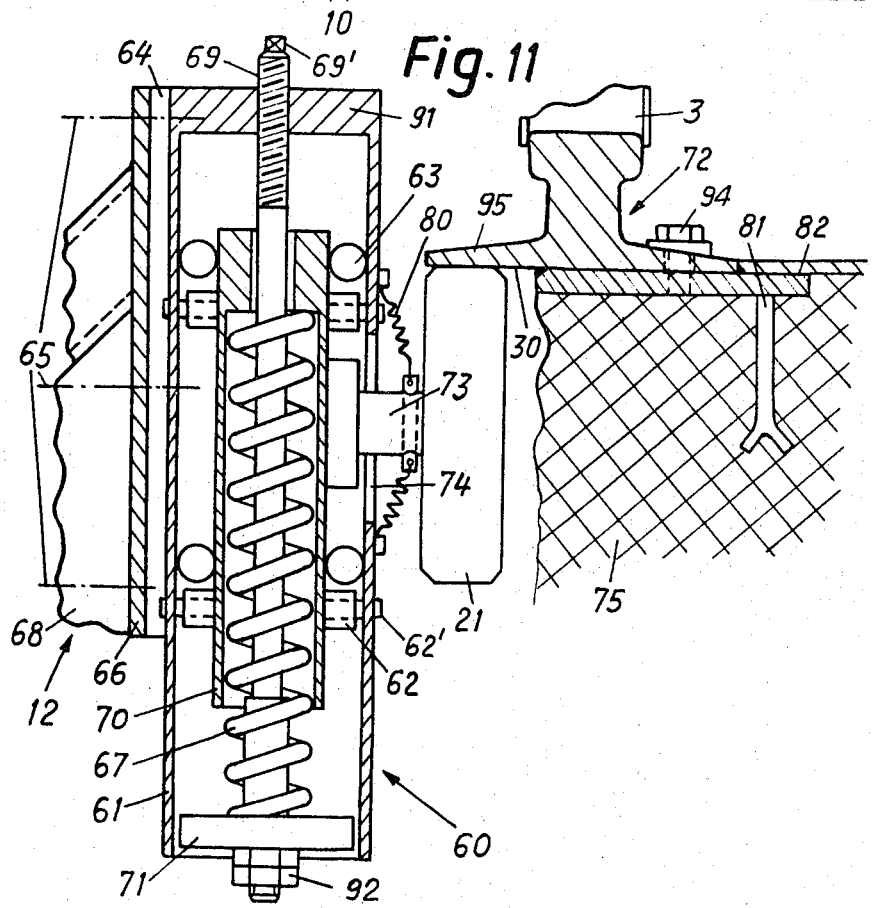
Figure 12:
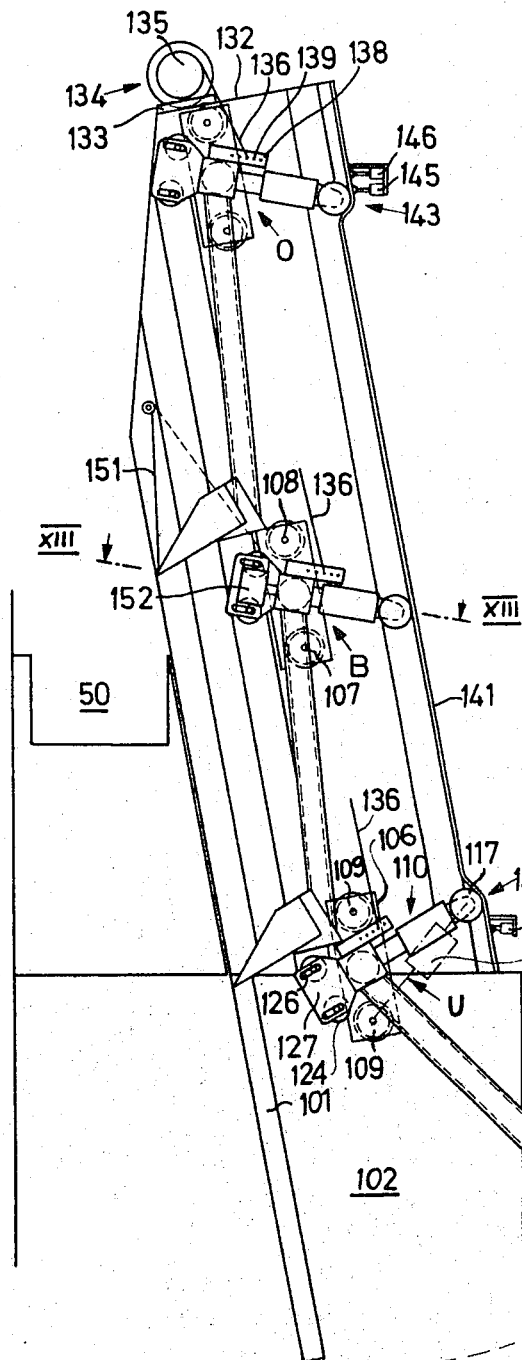
Figure 13:
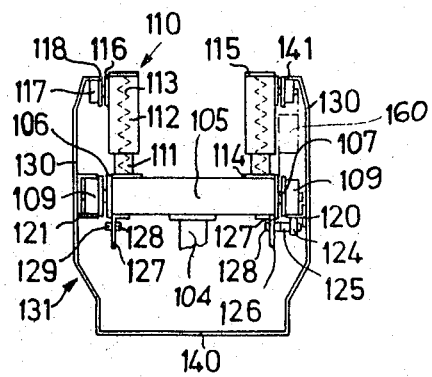
Figure 14:
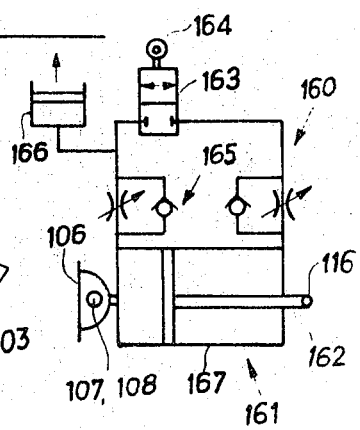

FIG. 6, which is on the same sheet as FIG. 1, is a plan view of the motor drive equipment for the back-and-forth movement of the apparatus;

FIG. 7 is a side view of a sludge removal apparatus in an uncovered settling tank shown in a transition position;

FIG. 8 is a side view of a modified form of the sludge removal apparatus of FIG. 7 in which the drive equipment is mounted on the deck of the carrier;

FIG. 9 is a side view of another modified form of the apparatus of FIG. 7 in which the settling tank is a covered tank;

FIG. 10 is a cross-sectional view of a twin settling tank apparatus utilizing a common reciprocating bridge;

FIG. 11 is a detail representation on a magnified scale of the portion designated A in FIG. 10;

FIG. 12 is a cross-section of a solids removing apparatus using a grasping rake, with the operating equipment shown in three different positions;

FIG. 13 is a cross-section of the rake mechanism along the line XIII—XIII of FIG. 12; and FIG. 14 is a circuit diagram of the switching arrangement of a hydraulic positioning interlock system for the sludge moving device.

Figure 3:
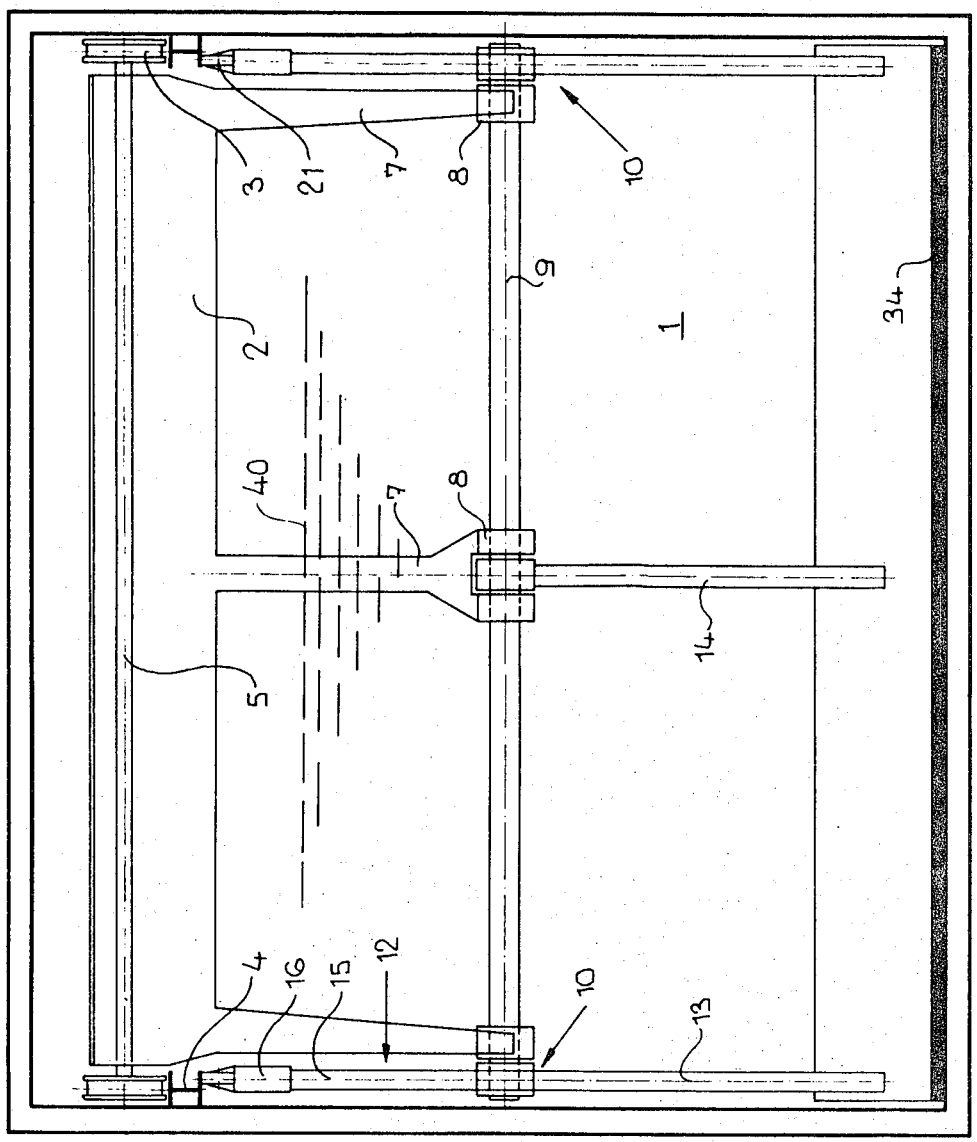
FIG. 3 is a front view of the sludge removal apparatus of FIG. 1 in its operating position.

FIGS. 1 to 6 show a sludge removal apparatus in a covered settling tank. The effluent water level is shown at 40 (FIG. 3). Well above that level is a traveling carrier 2, with wheels 3, running on supporting beams 4 as rails. A transverse axle 5 connects the wheels 3. A flexible cable attached to the traveling carrier 2 is operated by the drive mechanism 35 shown in FIG. 6, to produce the back-and-forth movement of the carrier 2. Downwardly extending bearing arms 7 hang down into the contents of the tank from the carrier 2, carrying bearings 8 at their lower extremities in which a shaft 9 is rotatably mounted to allow swinging motion of the arms presently to be described, affixed to the shaft 9 by bushings. At each end of the shaft 9 a two-armed strut 10 is carried by a bushing 11. The bushing 11 connects a lower arm 13, which may be referred to as a primary arm because it carries the sludge moving blade 25, and an upper arm 12, which may be referred to as a secondary arm, that engages the guides 30 and 31. In the middle of the settling tank, a strut 14 is mounted on the shaft 9 that has only a single arm extending downward and connected to the sludge moving blade 25.

The upper or secondary arm 12 has a telescoping extension formed of the telescoping tubes 15 and 16 (FIGS. 4 and 5). The telescoping surfaces are protected from the effluent by the water-tight bellows 17. A helical or cup spring 18 inside the telescoping tubes 15 and 16 is biased to extend the telescoping joint, and a limit to such extension is provided by the stop 23 guided in the slot 22a of the bracket 22. The outer tube 16 has a closed-off upper end on which a gooseneck 19 is mounted to provide a bearing for the shaft 20 of the roller 21, which may, for example, be made of synthetic material. The roller 21 is normally pressed (as a follower wheel) against the guide surface 31, so that the extension limit provided by the bracket 22 does not come into play so long as the roller 21 is in normal engagement with a guide.

A skimmer blade 26 is mounted on the secondary arm 12 to skim the solids that may collect on the surface of the effluent. The skimmer blade 26 is affixed to a rod 27, pivotally mounted on a collar 28, provided on the tubular member of the secondary arm 12. The angular position of the rod 27 is adjustable by means of the holding member 29. The sludge moving blade 25 is mounted at the lower end of the primary arm 13. As shown in FIG. 1, it can be held in the operating position shown in solid lines or in the idle return path position shown in dashed lines.

The roller 21 provided at the upper end of the secondary arm 12 runs along a guideway 30, formed by the underside of the support beam 4 that serves as a rail for the carriage 2. Reversal positions are provided on the guideway 30 in the neighborhood of each end of the settling tank 1, at which position the guideway 30 has a concave portion 31. A transition from the operating position to the idle position of the scraper blade 25, 34 is practically forced by this shaping of the reversal regions of the guideway 30, 31.

In the middle of one end of the settling tank 1 a compartment 32 is provided in which the drive mechanism 35 can be mounted in a suitable fashion, for example on the external side of the settling tank wall. On the drive shaft of the drive motor 35 is a pulley or drum 37, over which runs the flexible transmission member 36, which may be a cable or a chain, for example, that also runs around the end pulley 33, so as to provide an endless reversible means for moving the carrier 2 back and forth. The pulley 33 is provided, in a manner not shown, with a tensioning device by which the cable 36 can be held under tension. It is desirable to use a wire cable as the transmission member 26, as shown in these figures, because the individual wires can be zinc plated and thus protected against corrosion. A wire cable, moreover, can be replaced relatively easily and its maintainence is also simple, in contrast, for example, to the use of a chain as the flexible transmission member 36, where the links require particular maintainence care and in spite of that are susceptible to corrosion.

At the end of the drive shaft of the motor 35, opposite the pulley 37, an end-of-travel switching arrangement 38 is provided by which the reversal of the carrier motion is accomplished.

OPERATION OF THE APPARATUS OF FIGS. 1—6

FIG. 1 shows the transition from the return motion of the carrier 2 to the forward motion, with the blade 35 in operating position. In this transition the two-arm strut 10, the arms of which are at an obtuse angle to each other, swing from the position shown in dashed lines into the position shown in solid lines, in which last position the blade 25 runs its elastic squeegee 34, which may for example be made of synthetic material, along the bottom of the settling tank 1. The transition is urged both by the restoring force of the spring 18, as by the weight of the two-arm strut 10 and of the sludge removing blade 25.

As soon as the traveling carriage 2 reverses its direction, i.e. moves from the left to right in FIG. 1, the scraper blade 25 with its elastic squeegee 34 is supported on the floor of the settling tank 1 and is pressed against the bottom of the settling tank 1 and is pressed against the bottom of the settling tank 1 with a certain force as the result of the interplay of forces at the pivot 10. The resultant force here can be affected by the dimensioning of the two-arm strut 10, the reversal position 31, the strength of the spring 18 and the weight of the strut 10. This arrangement has the advantage that when the blade 25 meets more than a certain amount of resistance, it is raised up towards the return position, this operation serving as an overload safety feature.

In the case of transition from the operating stroke to the return travel (FIG. 2), the transition proceeds in the same way, because when the carriage 2 stops, the strut 10 takes a position like that shown in dashed lines, in the middle of the reversal position 31. When the return travel begins, therefore, the strut 10 then takes the position shown in dashed lines in FIG. 1.

It is important that the transition from one position to another at the reversal location 31 proceeds without any motorized help, but rather automatically with practically complete smoothness and quite independent of the condition of the guideway 30 and/or of the roller 21. The shift of position can, if desired, be produced at any desired position of the guideway 30 by reversing the direction of travel of the carriage 2, but in that case the transition is forced, whereas at the reversal position 31 provided with concave guides, the shift of position takes place with practically no additional drag. For this reason it is not important in what condition the guideway 30 and the roller 21 happen to be, i.e., whether dry, moist, or coated with some kind of film, as may happen according to the kind of waste water that the settling tank may handle.

Corrosion damage and related maintainence expenses are reduced by the arrangement above described in which the electrical equipment of the drive mechanism is all located outside of the settling tank structure, as in the outboard compartment 32. The sludge removal apparatus here described is therefore well suited for use in a covered or underground settling tank. The apparatus is also useful for aboveground and uncovered settling tanks, because in these cases also the exposure to corrosion and maintainence expense are reduced. The low profile of the traveling carriage 2, in contrast to the known traveling bridge structures, have the advantage for uncovered and aboveground installations that a relatively inconspicous structure results.

In FIGS. 7—11 modifications of the sludge removal apparatus already described are shown. In the uncovered installation shown in FIGS. 7 and 8, the traveling carriage 2 that runs on the wheels 3 is provided with additional guide wheels 3', mounted at the sides for rotation about a vertical axis so as to bear against a rail, not shown in these figures, provided on the wall of the settling tank 1. In the covered installation shown in FIG. 9, on the other hand, the traveling carriage 2 is moved back and forth on I-beams 4 that extend over the entire length of the settling tank.

The hub 11 of the arms 12 and 13 also mounts a shorter arm 42, that carries a counter weight 41, at a distance from the hub 11 that is preferably adjustable. The mass of the counter weight, as well as its leverage distance, is selected for partial or complete balancing of the arms 12 and 13 and the equipment carried by them, so that the shifting of position of the swinging structure 10 and thereby of the sludge moving blade 25 can be carried out without jerking or vibration.

The spring action extension of the secondary arm 12 of the structure 10, the telescoping parts of which are protected by the bellows 17, terminates in a gooseneck 19 in the apparatus of FIGS. 7, 8 and 9, just as in the case of the corresponding structure of FIGS. 1-6. In the form shown in FIGS. 7, 8 and 9, the gooseneck 19 carries a profiled shoulder 43 for engaging the end of the actuating rod 27 of the skimmer 26, which is pivoted on a bracket 27' extending from the downwardly projecting bearing arm 7, carried by the traveling carriage 2. During the return movement of the carriage 2, the swinging structure 10 has the position shown in the dash-dot lines in FIG. 7. At the end of the backward travel, the skimmer 26, with its flexible scraper 26' at its bottom edge, is raised by a guide rail 44 affixed to the settling tank wall above the water level, as the result of engagement of the roller 45 that is mounted on a bearing at the top of the skimmer 26, and runs along the rail 44.

During the backward movement of the carriage 2, the skimmer 26 dips into the water in the settling tank and pushes the floating solids collected on the surface into a collecting trough 46, forming part of a discharge channel 47. The skimmer is lifted by the guide rail 44 before it reaches the discharge channel 47, but its motion continues until it passes over the discharge trough 46. When the structure 10 shifts position to move the sludge moving blade 25 into its operating position, the skimmer 26 is retained in its raised position above the water surface by means of the profile shoulder block 43, even though the roller 45 moves downward in the guide rail 44, as the carriage moves forward. During the forward movement of the carriage, the blade 25 moves along the bottom of the settling tank 1 in its lowered position, and displaces the deposited sludge in front of it until at the end of its travel, at the other end (not shown) of the settling tank, the scraper blade 25 is lifted as the structure 10 is swung to its other position, at which time the skimmer 26 is dropped back into the water as the end of the arm 27 is freed from the shoulder 43. With this arrangement, actuation of the skimmer 26, as well as the necessary shifting of the blade 25, is accomplished entirely as the result of the movement back and forth of the traveling carriage 2.

Since in the construction shown in FIG. 7 the traveling carriage 2, as already mentioned, rolls on the walls of the settling tank 1, the provision of a steel beam running the length of the settling tank like the beam 4 of the uncovered tank installation shown in FIG. 9, would involve considerable additional expense. In order to avoid that expense, therefore, the guide rail 51 is mounted on supports 52 on the other side of the carriage 2, against which the roller 21 of the secondary arm 12 may bear. The guide rail 51 has a suitable curved concave running surface for the roller 21. Only in the region where the position of the scraper blade 25 is changed does the roller 21 engage the guide 50, fastened along the wall of the settling tank 1 and shown in dashed lines in FIG. 7 and 8. The roller 21 for this purpose extends laterally beyond the edge of the guide rail 51 mounted on the traveling carriage 2, so that the roller 21 can smoothly transfer from the guide rail 51 to the slightly lower fixed guide 50, so that it no longer engages the former. As soon as that happens, the shift of position of the structure 10 and its scraper blade 25 takes place as already described, after which the travel of the carrier reverses and the roller 21 is thereafter transferred back to the guide rail 51 of the carrier. A relatively short fixed guide 50 at each of the reversal locations of the carrier is all that is needed on the wall of the settling tank. In FIGS. 7 and 8 the actual position of the fixed guide 50 is practically hidden by the structure of the carriage 2, and the difference in height between the position of the fixed guide 50 and the guide rail 51 has been exaggerated for purposes of illustration. In fact, the difference in height can be much smaller than shown in FIGS. 7 and 8.

The difference between FIG. 8 and FIG. 7 is that the traveling carriage 2 shown in FIG. 8 is not actuated by a calbe drive, as at 33, 36 in FIG. 7, but carries its guide motor 54 which drives the wheels 3 in a manner not shown in the figure. The reversal of direction of travel of the carriage 2 can in this case be provided by appropriate automatic switches (not shown) located at the ends of the path of travel, and operating a suitable control circuit (likewise not shown). The arrangement for the shift in position of the scraper blade 25 and of the skimmer blade 26 is the same in FIG. 8 as it is in FIG. 7.

In FIG. 9 the arrangement for shifting position of the blades 25 and 26, illustrated in FIGS. 7 and 8, is shown as it may be used in a covered or underground settling tank installation. The shift in position of the blade 25 is carried out where the roller at the end of the arm 12 engages the guide 31, provided on the I-beam 4 which stretches along the entire length of the settling tank 1.

FIG. 10 shows a settling tank installation in which a preliminary settling tank 1 is provided alongside a main settling tank 2, and the sludge removal apparatus of both tanks are served by a common traveling carriage 2. It is often desired, however, to operate the two sludge removal mechanisms at different velocities. In that case, two separate traveling carriages could be used without great difficulty, the supporting wheels 3 of which would run along the tank edge 75, whith the help of rails 72. The added expense for the provision of separate traveling carriers - in this case rails and wheels at both sides of each tank, and two drives instead of merely one drive and two rails - can be outweighed by the advantages of having two traveling carriages and drives of standard construction and, moreover, of the fact that when one carriage or drive breaks down, the other one can continue to operate.

FIG. 10 uses a significant variation of the spring unit for the secondary arm of the swinging structure 10. This spring unit 60 is shown in detail in FIG. 11. Once it is determined to provide the spring unit outside the structure of the arm 12, the spring mounting necessary for pressing the follower roller 21 against the guide rail 30 can be constructed in a wide variety of forms. Thus, in FIG. 10 the sludge removal apparatus of the preliminary settling tank I has straight upper arms 12, whereas the corresponding arms of the sludge removal apparatus of the main settling tank II has bent-over arms instead. In the main settling tank II of FIG. 10, the discharge trough 76, with a toothed weir 78, is provided including a portion 77 parallel to the longitudinal walls of the settling tank, supported on brackets 79.

It is generally desired that the upwardly extending secondary arms 12 of the swinging structure of the sludge removal apparatus should not swing too near to the longitudinal troughs 77, so that they will not disturb the passage of the effluent liquid over the weir 77. This objective can be readily accomplished by a suitable shaping of the upwardly directed arms 12, as shown in FIG. 10. The spring units 60, however, are independent of the shaping of the arms 12 and are laterally mounted or affixed at the upper ends of these arms. It is logical in such an arrangement to provide a lateral mounting also for the follower wheels 21 on the spring units 60, so that the structure involving the spring units 60 and the follower wheels 21 may have a low profile, extending only a little above the discharge troughs 77.

As mentioned before, the structure of the spring units 60 is shown in detail in FIG. 11. The spring unit is encased in a tube 61 which may, for example, have a square cross-section. On one outer surface of this tube, two rails 64 are provided with tapped holes for screws located on the center lines 65 for the purpose of attachment of the unit to the plate 66, which is a terminal member of the upwardly direction secondary arm 12 of the swinging structure 10, held in position on the extremity of the arm 12 with the help of a stiffening bracket or web 68.

A shell 70, likewise of square cross-section, is mounted longitudinally movable within the tube 61 on roller bearings 62 and 63 that turn on shafts, such as the shaft 62'. The follower wheel 21 is mounted to one side on the shell 70 on a bearing stud 73 that projects through a slot 74 in the tube 61. The shell 70 is subject to the action of a compression spring 67 for which it serves as a sheath. A biasing force can be applied to the spring 67 by screwing the spindle 69 by applying a wrench to its square extremity 69'. The spindle 69 is threaded into the cap 91 provided at the upper end of the tube 61. At the bottom of the spindle 69 is a cap plate 71 for the spring 67, the position of which on the spindle can be adjusted by means of two nuts 92. The slot 74 is preferably covered by a bellows cover 80 that is fastened at one end around the stud 73, and at the other end to the tube 61.

A rail 72 is mounted along the top edge 75 of the tank by screws 94 that engage with a longitudinal plate 82, fastened to the tank wall by means of anchors 81. The underside of the bottom web 95 of the rail 72 provides the guide surface 30 against which the follower wheel 21 rolls. This arrangement of the guide surface is particularly suitable for uncovered tanks. In covered installations, an angle bar or channel can more readily be anchored on the sidewall of the tank, in which case the horizontal web or webs can provide on one side a surface for supporting the wheels 3 of the traveling carriage 2, and on the other side a surface for guiding the folower wheel 21.

The embodiments of the invention shown in FIGS. 7-11 show that it is possible with relatively minor changes to apply the same basic sludge removal apparatus shown in FIGS. 1-6, regardless whether a covered or uncovered installation is involved. It is also a matter of choice whether to use a cable drive for the traveling carriage, or whether to provide a drive mounted on the deck of the carriage. A stop 53 projecting from the support arm 7 serves to limit the swinging movement of the structure 10, but this stop does not come into play in normal shifting of position of the scraper blade 25, for it serves merely as a safety stop to prevent the blade 25 from being raised substantially higher than its return travel position.

FIGS. 12 and 13 show a solids removal apparatus using a rake member as the operative element, to grasp and and drag the solid matter so as to keep clean a grating 101, provided along the side of a channel 102. The grating 101 consists, for example, of a number of straight rods spaced apart from each other, between which penetrates a toothed rake 103 affixed to an actuating arm 104. According to the width of the channels 102, the rake 103 can be mounted on a single arm 104 or on two or more such arms.

The arm 104 is affixed on the shaft 105, which allows a swinging movement of the arm 104 when the shaft turns. The shaft 105 is mounted in a traveling carriage 106 that rolls on four wheels 109, mounted on two axles 107 and 108. Two other arms 110 are mounted on the shaft 105 at an angle to the arm 104. The arms 110 are each made of two telescoping pieces of tubing 111 and 112, enclosing a spring 113 compressed between the pedestal 114 of the tube 111 and the cap 115 of the tube 112. Extending laterally from the tube 112 is a roller 117, connected to a bearing stud 116, carrying a flange 118. The carriage wheels 109 run together on a T-rail 120 (FIG. 13, right side), or on a channel bar 121 (FIG. 13, left side). The swinging motion of the arms 110 is limited either by rollers 124 or by studs 129. The roller 124 is mounted on a bearing stud 125, fastened by means of a clamp nut 128 in a slot 126 of a bracket 127, affixed to the shaft 105. The stud 129, as already mentioned, can be used instead of the roller 124, for limiting the swinging scope of the arm 110 with respect to the carriage 106. The stud 129 in practice is used in combination with a channel rail 121, whereas the roller 124 is used with a T-rail 120.

The rails 120 and 121 are affixed within a U-shaped trough 131 that is so supported on the channel 102 that the rails 120 and 121 run parallel to the inclination of the grating 101. The upper end 132 of the trough 131 is a platform 133, carrying an electric hoist 134, on the drum 135 of which is wound a wire cable 136, the end of which is fastened to a strut 138 attached to the shaft 105. The strut 138 may have a hole 139 bored through it, such that the end of an appropriate cable 136 suited to the particular operating conditions can be threaded and fastened. At the rim of the wall 130 of the trough 131, a guideway 141 is provided for the adjacent roller 117. For this purpose the guideway 141 is preferably provided with a smooth surface on the inside, for example by machining or by applying a coating, or in some similar way. The guideway 141 is provided with reversal and deflection positions 142 and 143 at which end-of-path switches 145 and 146 are arranged for actuation by the rollers 117 of the arms 110.

OPERATION OF THE RAKE EQUIPMENT:

The carriage 106 is lowered by its own weight as the hoist 134 pays out the cable 136, while the rake 103 is swung out of engagement with the grating 101. When the arms 110 reach the shift and reversal position 142, the rake 103 swings into the grating 101 at the offset position 142 of the guideway 141, as the result of the spring force provided in the arms 110, which may be supplemented if desired by the provision of a weight 152 mounted on the bracket 127. The upward movement begins when the end-of-path contact 144 is actuated, when the arm 110 is in the position U. When the carriage is in the position B, the rake 103 reaches the upper end of the grating 101. The upward movement is continued, however, until the position 0 is reached while the rake 103 lifts the material it has been raising until it passes a discharge position 150, where it empties itself through an opening (not shown) in the floor 140 of the trough 131, with the assistance of an ejector member 151. The discharge receiver 150 may, for example, be a container or a conveyor.

In the position O, the arm 110 again reaches a shift and reversal position, in this case the position 143, where the rake 103 is swung away from the floor 140 of the trough 131. That swinging motion occurs automatically as the result of the offsetting of the guideway 140 at the position 143, as that operates on the spring force of the arm 110, which may be aided by the counter-weight 152. When the rake 103 swings away from the floor 140 of the trough 131, the end-of-path contact 145 is passed by the roller 114, which causes the reversal of the hoist motor and the lowering of the rake 103.

If on account of some obstruction or difficulty the carriage 106 cannot reach the position U, the cable 136 unwinds and then winds up again on the other side of the drum 135, so that the carriage 106 is raised again with the rake 103 swung out of operative position. Because the end-of-path contact 144 has not been operated, the end-of-path contact 145 is not unlocked for operation, so that the carriage continues until the second end contact 146 is reached, which shuts off the apparatus. In consequence, overloading and overstressing of parts of the material moving apparatus is reliably prevented.

FIG. 14 is a diagram of a hydraulic safety interlock 160, which consists essentially of an actuating cylinder 161, the working chamber of which is provided with a switching valve 163 provided with an actuating roller 164. Throttle check valves 165 and a reservoir 166 complete the system. The position interlock 160 serves to hold the sludge removal blade in its operating position or in its idling or return position. For this purpose the actuating cylinder 161 is interposed between the carriage and the swinging structure, mounted on the carriage, on which the sludge removal blade or rake is fastened. This is schematically indicated in FIGS. 12 and 13. A piston rod 162 may, for example, be pivoted on the stub shaft 116 of the arm 110, while the cylinder 167 can likewise be pivotally mounted on one of the axles 107 or 108 of the carriage 106. At the reversal positions of the apparatus, the follower wheel 164 of the switching valve 163 receives pressure, so that both cylinder spaces are short-circuited, and the arm 104 can carry out its movement. As soon as the carriage leaves its reversal position, the follower wheel 164 is released, causing the cylinder chambers to be blocked, so that the arm 104 and the blade or rake operated by it are secured in the position they have just reached. The throttle check valve 165 is designed to oppose or prevent the generation of a shock or jerk when the sludge moving device shifts from one to the other of its positions. The reservoir 166 is provided to make up for the slight losses of hydraulic fluid by leakage that may occur. The position interlock 160 can be applied to all types of sludge removal apparatus of the reciprocating type.

Although the invention has been described with reference to particular embodiments, it should be understood that variations and modifications may be made within the inventive concept.

I claim:

1. A solids removal apparatus for removal of solids from below the surface of a body of liquid comprising, in combination:

a carriage mounted for back-and-forth movement in a linear path above the surface of the liquid from which solids are to be removed and provided with drive means for producing back-and-forth movement thereof;

at lest one primary depending arm pivoted on a shaft supported by said carriage for swinging in the directions of travel of said carriage;

solids moving means carried on the lower extremity of said primary arm or arms;

a secondary arm at a fixed angle to a least one of said primary arms;

positioning means for said secondary arm, including an adjustable spring biased extension carrying a follower and a guide track therefor disposed longitudinally of the path of movement of said carrier, said follower being pressed against said guide track and so arranged that each said primary arm has a forward solids removing movement in a first position of said primary arm when said carriage moves in one direction, and a backward idle movement in a second position of said primary arm when said carriage moves in the other direction, said positioning means operating to power the shift of position of said primary and secondary arms from the motion imparted to said carriage by said drive means.

2. A solids removal apparatus as defined in claim 1 in which said adjustable spring biased extension is provided with means for imposing a limit on the extended length thereof.

3. A solids removal apparatus as defined in claim 1 in which said guide track is concave towards said follower at the places of reversal of movement of said carriage.

4. A solids removal apparatus as defined in claim 1 in which said carriage is free of electrical equipment and in which said means for providing back-and-forth movement of said carrier include drive means outside the vicinity of said body of liquid, connected by a flexible mechanical transmission means to said carrier.

5. A solids removal apparatus as defined in claim 1 in which skimmer means are provided on at least one seconary arm and so disposed that during the solids removal movement of said solids moving means, said skimmer means are held in their upraised position.

6. A solids removal apparatus as defined in claim 5 in which said skimmer means are pivotally mounted on a bearing arm of said carriage, and arranged for guiding engagement with guide means mounted adjacent to and along said surface of said body of liquid.

7. A solids removal apparatus as defined in claim 1 in which said body of liquid is located in a settling tank and, in which the guide track for said secondary arm or arms extends over only a portion of the length of said settling tank, including at least the reversal positions of said carriage, and in which, further, said carriage is provided with a support rail which provides a bearing surface for said secondary arm outside the region in which said guide track is provided.

8. A solids removal apparatus as defined in claim 7 in which said guide track and said support rail have a concave shape.

9. A solids removal apparatus as defined in claim 1 in which spring units are laterally mounted on at least one of said secondary arms for carrying roller means in engagement with the guide path for said secondary arms (FIG. 11).

10. A solids removal apparatus as defined in claim 9 in which each of said spring units includes a tube affixed to the upper end of said secondary arm, in which tube spring means are mounted together with means for adjusting the bias thereof, said spring means positioning a shell movable in guides or bearings and carrying a follower roller for engaging a guide rail or flange.

11. A solids removal apparatus as defined in claim 9 in which said guide rail is provided by the under side of the base web of a support rail for said carriage.

12. A solids removal apparatus as defined in claim 1 in which said solids moving means at the lower extremity of said primary arm or arms is in rake form for engagement with an inclined grating, and in which said drive means includes a cable hoist arranged to move said carriage on an inclined path and a drive for said cable hoist provided at the upper ends of rails providing the said inclined path for movement of said carriage.

13. A solids removal apparatus as defined in claim 1 in which rails providing the path for movement of said carriage and the guide track for said secondary arm are arranged in a U-shaped channel (131).

14. A solids removal apparatus as defined in claim 1 in which the reversal and swing positions of said guide track are provided with end contacts cooperating with said secondary arm for control of said drive means.

15. A solids removal apparatus as defined in claim 1 in which the movement of said primary and secondary arms relative to said carriage is arranged to operate a positioning interlock device, which is releasable at reversal positions by means of switching means operable by the presence of said carriage at said reversal positions.

* * * * *